Patented Feb. 17, 1953

2,628,976

UNITED STATES PATENT OFFICE

2,628,976

METHOD OF PRODUCING CONCENTRATED FORMIC ACID

Henry H. Johnsen, Notodden, Norway, assignor to Norsk Hydro-Elektrisk Kvaelstofaktieselskab, Oslo, Norway No Drawing. Application August 21, 1950, Serial No. 180,701. In Norway August 31, 1949

5 Claims. (Cl. 260—542)

It is known to produce formic acid by reacting diluted mineral acids like sulphuric acid or nitric acid upon formates and thereupon isolating the formed free formic acid for instance by means of vacuum distillation. When using diluted sulphuric acid or diluted nitric acid and ordinary vacuum distillation, with or without dephlegmating, it is however not possible to produce formic acid of higher concentration than about 77%, as a mixture of formic acid and water under the existing conditions has its lowest vapour tension at about 77% formic acid and about 23% water.

It is now desirable to be able to produce directly the formic acid in a more concentrated state than the azeotropic mixture. If it is tried to arrive at this by having concentrated sulphuric acid react upon formates without at the same time taking special precautions, the result is only that the formic acid is decomposed into water and carbon monoxide and if in a corresponding way concentrated nitric acid is brought to react upon formates, the result is a decomposition and oxidation of the formic acid to water and corbonic acid and furthermore a decomposition of the nitric acid to oxides of nitrogen and water.

It is however known that it is possible to produce concentrated formic acid from formates and concentrated sulphuric acid without decomposition of the formic acid by having the concentrated sulphuric acid react upon the formates in a milieu of concentrated formic acid.

It is also known that by producing formic acid from formate and diluted nitric acid the decomposition of the formed formic acid can be effectively counteracted by adding buffer-substances, for instance urea or amines, to the mixture of reaction.

We have now arrived at a method by which it is possible to produce concentrated formic acid of high purity, and furthermore valuable nitrate, in a cyclic process directly from formates and concentrated nitric acid without decomposition of the formic acid. The method consists in reacting the formate and concentrated nitric acid in the presence of formic acid as a diluent and preferably an amine or urea as a stabilizer. In order to get a pure nitrate it has proved of advantage to use a small excess of nitric acid. The mixture of reaction is subjected to a fractional distillation in vacuum. To start with the distillate will consist of concentrated formic acid which is collected separately. By continued vacuum distillation the composition of the distillate will gradually change in consequence of an increasing content of water and possibly nitric acid. According to an embodiment of the method the later fractions of distillate are conveyed back to the step of reaction where they are used as a diluent and where the cycle of production then is closed by adding new quantities of formate and concentrated nitric acid and possibly buffer-substances and adjusting quantities of formic acid and water. Nitrate and buffer-substances are left as residue from the distillation.

The formic acid used as a diluent should have a concentration of between 65 and 80%. With a 98% nitric acid the concentration of the diluting formic acid can suitably be fixed at 70 to 72%. The quantity of free formic acid for the dilution of the mixture of reaction should correspond with 1, preferably between 2 and 3 equivalents for each equivalent of formate.

The method can be illustrated by the following example:

3,250 gr. formate of calcium and 82 gr. of urea was stirred out in 9,710 gr. of 70.9% formic acid. During stirring and cooling to 20–25° C. was added 3,317 gr. 98% nitric acid, whereupon the mixture of reaction was subjected to a fractional distillation in vacuum, the pressure being held at 20–30 mm. Hg absolute. The first distillate which passed over at 31–35° C. was collected as a separate fraction. The fraction of distillate had a weight of 2,397 gr. of which 2,121 gr. was formic acid, that is 88.5%. Nitric acid could not be detected in this fraction of distillate.

Upon continued vacuum distillation, under which the pressure of distillation continuously was held at 20–30 mm. Hg absolute and the temperature gradually rose to 113° C., the rest of the formic acid was distilled off together with water and some nitric acid and was thereupon used as a diluent for a new charge of formate of calcium and nitric acid with addition of urea. This part of the distillate had a weight of 9,564 gr. of which 6,880 gr. was formic acid, 83 gr. nitric acid and 2,601 gr. water.

The residue from distillation was 4,182 gr. and consisted of 4,100 gr. of nitrate of calcium and the urea added, which had partly been transformed to nitrate of ammonia.

I claim:

1. A process for the preparation of concentrated formic acid by the reaction of calcium formate with nitric acid comprising, treating a reaction mixture containing calcium formate, a stabilizer selected from the group consisting of urea and amines, and as a diluent, a concentration of about 65–80% aqueous formic acid, with highly concentrated nitric acid in an amount which is in small excess of that required to react with the calcium formate, the amount of diluent formic acid in the reaction mixture being between about 2-3 equivalents of free formic acid for each equivalent of nitric acid reacting with the calcium formate, subjecting the so treated mixture to fractional vacuum distillation to collect a first fraction of greater than 80% concentration of formic acid, a second fraction of less concentrated formic acid of such concentration to be suitable as a diluent in the fresh reaction of calcium formate, stabilizer and concentrated nitric acid, and a residue containing calcium nitrate.

2. A process as in claim 1 wherein the reaction mixture contains a urea stabilizer.

3. A process as in claim 1 wherein the reaction mixture contains an amine stabilizer.

4. A process as in claim 1 wherein the diluent aqueous formic acid in the reaction mixture is from 70 to 72% free formic acid and the concentrated nitric acid is of 98% strength.

5. A continuous process for the preparation of concentrated formic acid as in claim 1 wherein the second fraction of less concentrated formic acid obtained from the fractional vacuum distillation of the nitric acid treated mixture is used as fresh diluent in the treatment of additional quantities of calcium formate and stabilizer with concentrated nitric acid, followed by fractional vacuum distillation to recover highly concentrated formic acid, less concentrated formic acid and the calcium nitrate containing residue.

HENRY H. JOHNSEN.

REFERENCES CITED

The following references are of record in the file of this patent:

UNITED STATES PATENTS

| Number | Name | Date |
|---|---|---|
| 1,848,504 | Strauss et al. | Mar. 8, 1932 |
| 1,919,851 | Luscher | July 25, 1933 |

FOREIGN PATENTS

| Number | Country | Date |
|---|---|---|
| 169,730 | Germany | Apr. 19, 1906 |